US012373658B1

(12) United States Patent
Vinogradov et al.

(10) Patent No.: US 12,373,658 B1
(45) Date of Patent: Jul. 29, 2025

(54) METHOD OF INCREASING BRIGHTNESS IN BARCODE READERS

(71) Applicant: ZEBRA TECHNOLOGIES CORPORATION, Lincolnshire, IL (US)

(72) Inventors: Igor Vinogradov, Oakdale, NY (US); Miguel Orlando Rodriguez Ortiz, Coram, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 18/790,860

(22) Filed: Jul. 31, 2024

(51) Int. Cl.
*G06K 7/10* (2006.01)
*G06K 7/14* (2006.01)
(52) U.S. Cl.
CPC ....... *G06K 7/10732* (2013.01); *G06K 7/1413* (2013.01)
(58) Field of Classification Search
CPC .................................................. G06K 7/10732
USPC ..................................................... 235/462.42
See application file for complete search history.

(56) References Cited

U.S. PATENT DOCUMENTS

| 2012/0081884 A1* | 4/2012 | Gonzalez | ............ F21V 23/0407 362/103 |
| 2019/0025671 A1* | 1/2019 | Peterson | ................ G03B 15/07 |

* cited by examiner

*Primary Examiner* — Toan C Ly
(74) *Attorney, Agent, or Firm* — Yuri Astvatsaturov

(57) ABSTRACT

Systems and methods for adjusting illumination intensity of a data capture device having an illumination assembly and an imaging assembly are disclosed. An example method includes detecting an illumination level of an environment and operating the illumination assembly in a first mode over a first period of time, a second mode over a second period of time, and a third mode over a third period of time. The method further includes (i) in the first mode, providing a first illumination having a first intensity, (ii) in the second mode storing energy in an energy storage element, and (iii) in the third mode providing third illumination at a third intensity higher than the first intensity. A controller controls the illumination assembly to be configured to be in the first mode, second mode, or third mode based on the illumination level.

20 Claims, 5 Drawing Sheets

METHOD OF INCREASING BRIGHTNESS IN BARCODE READERS

BACKGROUND

Imaging devices, such as barcode readers, many include illumination sources to provide illumination for imaging or for performing decoding of a barcode. Successful and efficient decoding of barcodes requires specific lighting conditions that are dependent on multiple factor including types of barcodes, resolution requirements, environmental conditions, etc. As such, providing proper illumination can be a complex process and most barcode readers are not robust enough to provide illumination given these factors. Typically barcode readers that include illumination systems provide are limited in providing a single type of illumination such as a flash, or constant illumination to a field of view. As such, an object further from the barcode reader, or in a dark environment, may not be properly illuminated, and the barcode reader may not be able to properly capture images and decode a barcode of an object far away. These illumination systems are often limited in brightness by a number of illumination sources of the system, which is not readily able to be increased. Additionally, the number of light sources may not further increase brightness for handheld systems as power considerations are also limiting in the amount of light that is capable of being provided by a system.

Accordingly, there is a need for improvements to systems for dynamically changing the illumination provided by an illumination system for capturing images and performing reading and decoding of barcodes.

SUMMARY

In an embodiment, the present invention is a method for adjusting illumination intensity of a data capture device having an illumination assembly and an imaging assembly. The method includes detecting an illumination level of an environment of the imaging based data capture device and the image brightness of a barcode; operating at least one of the illumination assembly and the imaging assembly in a first mode over a first period of time, a second mode over a second period of time, and a third mode over a third period of time; providing, by the illumination assembly operated in the first mode, a first illumination having a first intensity; storing energy, with the illumination assembly operated in the second mode, in an energy storage element; providing, by the illumination assembly operated in the third mode, third illumination at third intensity higher than the first intensity; and controlling, by a controller, the illumination assembly to be configured to be in the first mode, second mode, or third mode based on the illumination level.

In variations of the current embodiment, the method further includes capturing, by the imaging assembly operating in the first mode, images at a first frame rate; and capturing, by the imaging assembly operating in the second mode, images at a second frame rate, the second frame rate being a reduced frame rate as compared to the first frame rate.

In more variations, storing energy includes redirecting energy from at least one of the imaging assembly and the illumination assembly to a capacitor electrically coupled with an illumination source of the illumination assembly. In some variations the method further includes providing, with illumination assembly operated in the second mode, no illumination from the illumination assembly, and wherein storing energy comprises redirecting energy from the illumination assembly to the energy storage element.

In yet more variations, the method further includes providing, via an aiming assembly, an aiming pattern to a field of view of the imaging assembly; performing range detection using the aiming pattern and determining a distance of a target object; and controlling, via the controller and based on the distance of the target object, the mode of the illumination assembly.

In additional variations the method further includes controlling, via the controller and based on an energy level of the energy storage element, the mode of at least one of the imaging assembly and the illumination assembly.

In further variations, detecting the illumination level includes detection the illumination level by a dedicated brightness sensor configured to receive illumination from the environment and provide a signal indicative of the illumination to the controller.

In some variations, detecting the illumination level includes capturing, via the imaging assembly, an image of a field of view of the imaging assembly; and determining the illumination level from the captured image of the field of view.

In another embodiment, the present invention is a data capture device. The data capture device includes an imaging assembly having an imaging sensor configured to capture images of a field of view of the imaging assembly; an illumination assembly having one or more illumination sources configured to provide illumination to at least a portion of the field of view of the imaging assembly; a controller configured to control modes of operation of the illumination assembly in a first mode, a second mode, or a third mode; and one or more processors and machine readable instructions that when executed by the one or more processors cause the device to: detect an illumination level of an environment of the device; provide, by the illumination assembly in the first mode, first illumination having a first intensity over a first period of time; store energy, with the illumination assembly in the second mode, in an energy storage element; provide, by the illumination assembly in the third mode, third illumination at a third intensity higher than the first intensity for a third period of time; and control the illumination assembly to be configured to be in the first mode, second mode, or third mode based on the illumination level.

In a variation of the current embodiment, the machine readable instructions further cause the device to capture, by the imaging assembly in a first mode, images at a first frame rate; and capture, by the imaging assembly in a second mode, images at a second frame rate, the second frame rate being a reduced frame rate as compared to the first frame rate.

In continued variations, to store energy the machine readable instructions cause the device to redirect energy from at least one of the imaging assembly and the illumination assembly to a capacitor electrically coupled with the illumination source of the illumination assembly.

In additional variations, the machine readable instructions further cause the device to provide no illumination from the illumination assembly in the second mode and store energy by redirecting energy from the illumination assembly to the energy storage element.

In some variations, the device further includes an aiming assembly configured to provide a visual indicator of the field of view of the imaging assembly, and wherein the machine readable instructions further cause the device to: provide, via the aiming assembly, the visual indicator of the field of view of the imaging assembly; performing range detection using the visual indicator and determine a distance of a target object; and control, via the controller and based on the distance of the target object, the mode of at least one or more of the imaging assembly and the illumination assembly.

In yet more variations, the machine readable instructions further cause the device to further control, based on an energy level of the energy storage element, the mode of at least one of the imaging assembly and the illumination assembly.

In even more variations, the device further includes a brightness sensor configured to detect the illumination level of the environment and to provide a signal indicative of the illumination level to the controller for controlling the mode of one or more of the imaging assembly and the illumination assembly.

In yet another embodiment, the present invention is a non-transitory computer-readable media storing computer-executable instructions that, when executed via one or more processors, cause one or more systems to: detect an illumination level of an environment of the device; provide, by an illumination assembly in a first mode, first illumination having a first intensity over a first period of time; store energy, with the illumination assembly in a second mode, in an energy storage element in the second mode; provide, by the illumination assembly in a third mode, third illumination at third intensity higher than the first intensity for a third period of time; and control, by a controller, the illumination assembly to be configured to be in the first mode, second mode, or third mode based on the illumination level.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
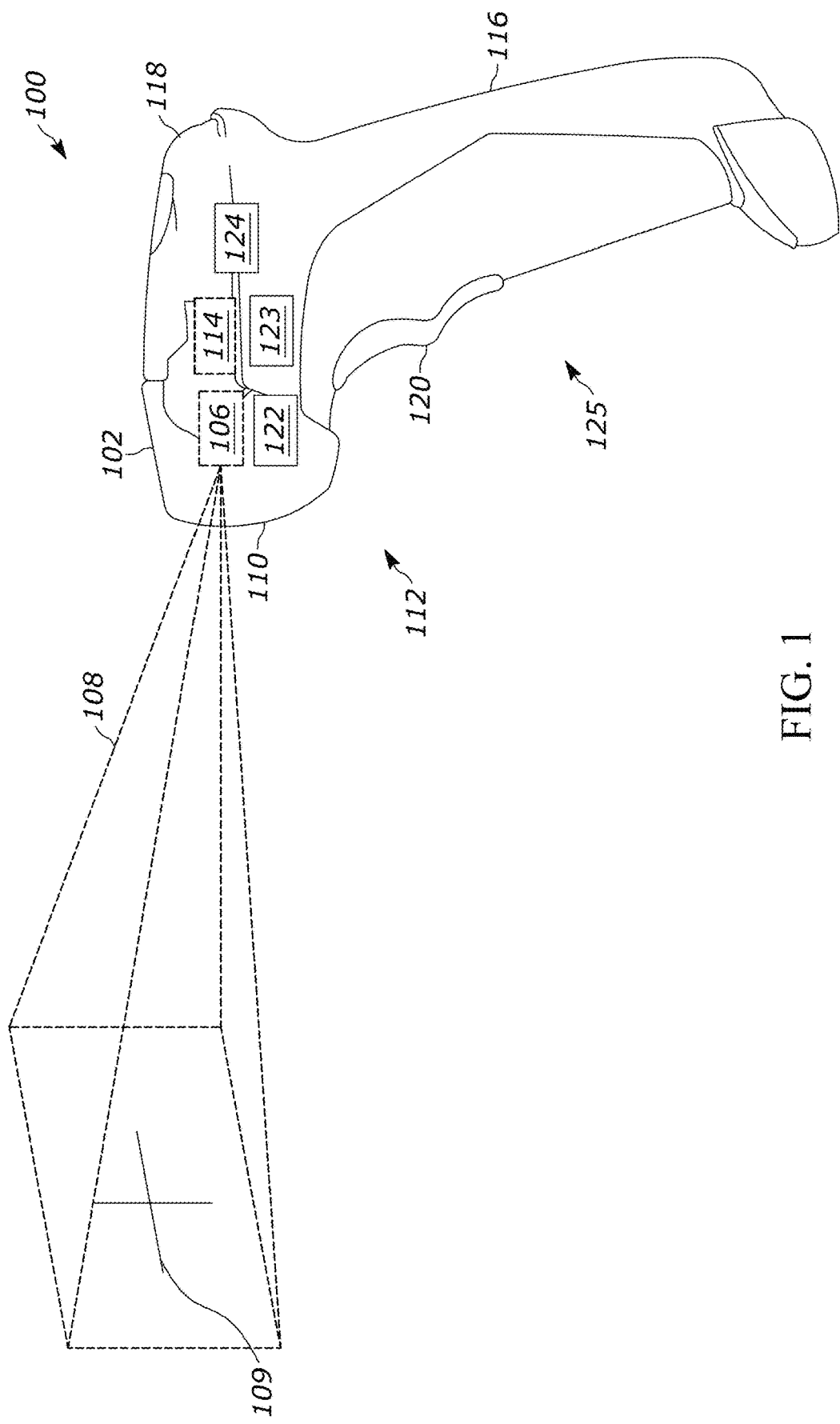
FIG. 1 is a perspective view of an example scanning device, in accordance with various embodiments of the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Imaging devices, such as a barcode scanner, may scan and image objects in various environments and under a wide variety of conditions. Handheld scanners often are used to scan items that are very close, within a few inches, and may also be used to scan objects further away, either a foot or more. Brightness of an environment, or illumination provided to a target object, is integral for performing efficient scanning and imaging. Insufficient light can result in erroneous scanning operations, or the inability to perform a barcode scan altogether. Additionally, handheld barcode readers and imaging devices have a portable power supply and therefore are limited in the illumination that is able to be provided via the device itself. As such, handheld devices are often not capable of imaging and performing barcode reading in a wide range of lighting conditions and environments.

An example imaging device and method is provided that enables imaging devices to provide variable illumination based on the brightness or illumination of an object or environment. The method includes operating a device in multiple modes to reserve power in an energy storage element to later provide the saved power to illumination sources, based on a required illumination amount for performing imaging. The described methods can be implemented in handheld devices as well as in point of sale systems and other stationary or installed systems and devices.

FIG. 1 is a perspective view of an example imaging device 100, in accordance with various embodiments of the present invention. The example imaging device 100 includes an example housing 102 that includes a generally elongated handle or lower handgrip portion 116, and an upper body portion 118 having the front side 112 at which the front-facing opening or window 110 is located. The cross-sectional dimensions and overall size of the handgrip portion 116 are such that the example imaging device 100 can be conveniently held in an operator's hand during operation. The front-facing opening or window 110 is configured to face generally away from a user when the user has the example imaging device 100 in a handheld position. The portions 116 and 118 may be constructed of a lightweight, resilient, shock-resistant, self-supporting material, such as a synthetic plastic material. The housing 102 may be injection molded, but can also be vacuum-formed or blow-molded to form a thin hollow shell which bounds an interior space whose volume is sufficient to contain the various components of the handheld scanner device 100. Although the housing 102 is illustrated as a portable, point-of-transaction, gun-shaped, handheld housing, any other configuration including a hands-free configuration could be used.

The example imaging device 100 also includes an imaging assembly 106 that is disposed within the example housing 102. The imaging assembly 106 captures image data representing a target in a field of view 108 (FOV) at least partially defined by a front-facing opening or window 110 (also referenced herein as an "optical window") on a front side 112 of the example imaging device 100. The example imaging device 100 also includes an imaging shutter 122 configured to actuate and expose the imaging assembly 106 to an external environment, a portion of which is included in the FOV 108.

More specifically, the example imaging device 100 may also include a manually actuatable trigger 120 that is mounted in a moving relationship on the handgrip portion 116 in a forward facing region of the handgrip portion 116 that is configured to actuate the imaging shutter 122. An operator's finger can be used to actuate (e.g., depress) the trigger 120 once a target falls within the imaging FOV 108, thereby causing the imaging shutter 122 to actuate (e.g., open) and expose the imaging assembly 106 to capture an image of the target. As a result of actuating the trigger 120, the example imaging device 100 may generate an aiming pattern 109, which may visually indicate the FOV 108 of the example imaging device 100 for the operator utilizing the device 100, and may more specifically indicate a region within the FOV 108 where the device 100 may successfully scan and/or otherwise interpret an indicia within the FOV 108. In certain instances, the imaging assembly 106 may be configured to capture the image during an image capture period, during which, the imaging shutter 122 actuates and exposes the imaging assembly 106 to the external environment. The example imaging device 100 also includes an indicia decoder 114 in communication with the imaging assembly 106, and configured to receive image data comprising the image and decode an indicia represented in the image data.

The example imaging device 100 also includes an illumination assembly 123 configured to emit illumination. Generally speaking, the illumination assembly 123 may be configured to output illumination in response to receiving a forward voltage from a battery (not shown) as a result of the operator actuating the trigger 120. The illumination assembly 123 may be or include a light emitting diode (LED) that may be configured to output illumination in a variety of wavelengths or patterns. For example, the illumination assembly 123 may generate the aiming pattern 109. Regardless, the illumination assembly 123 may be and/or include a single LED, multiple LEDs configured in series, multiple LEDs configured in parallel, multiple LEDs configured in series/parallel, and/or any other suitable number and/or configuration of LEDs or illumination sources or combinations thereof.

Figure 2:
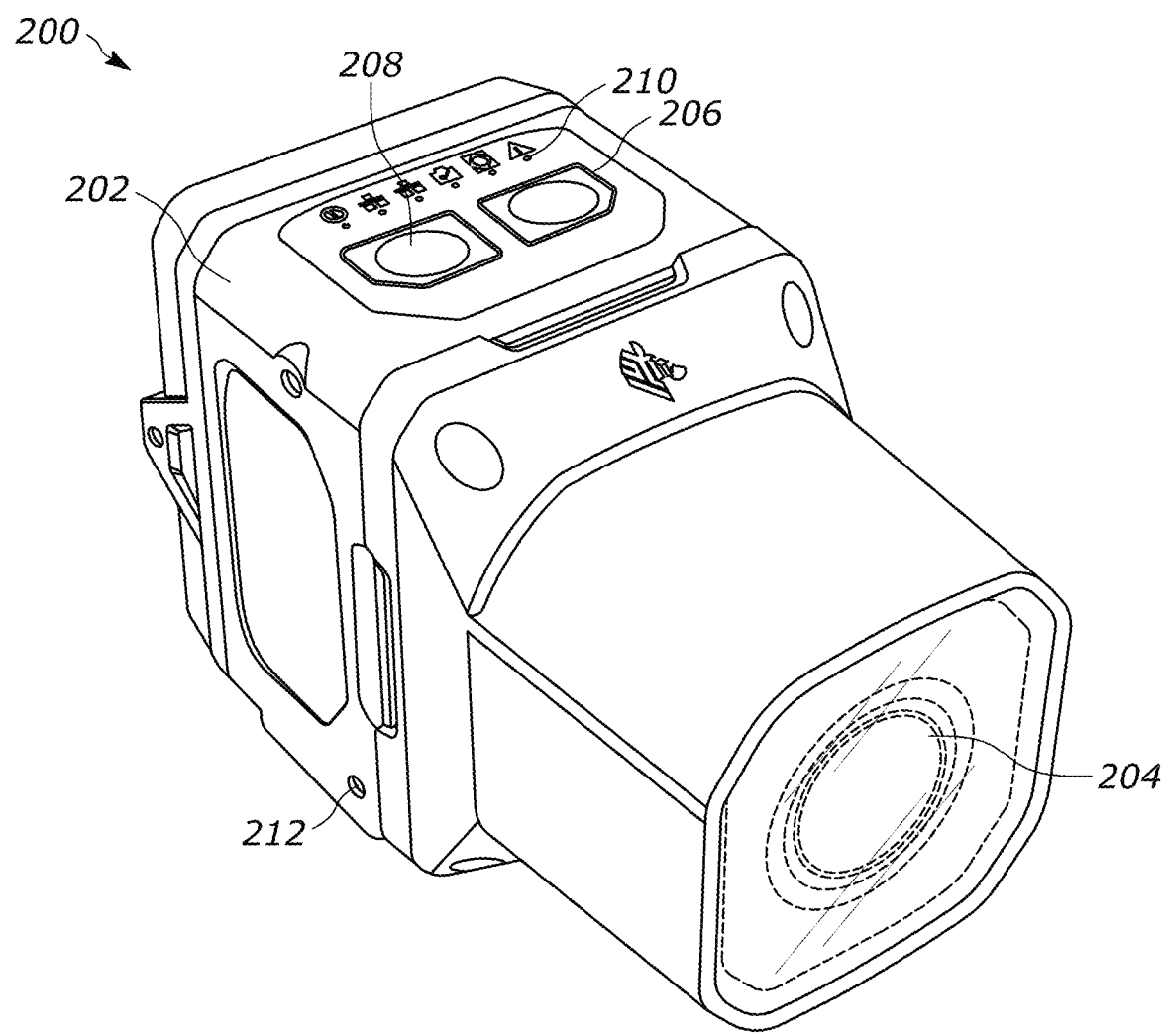
FIG. 2 is a perspective view of another example imaging device 200 in accordance with embodiments described herein.

FIG. 2 is a perspective view of another example imaging device 200 in accordance with embodiments described herein. The imaging device 200 includes a housing 202, an imaging aperture 204, a user interface label 206, a dome switch/button 208, one or more light emitting diodes (LEDs) 210, and mounting point(s) 212. As imaging assembly captures images of a FOV of the imaging device 200 through the imaging aperture 204. The FOV of the imaging device 200 extends along one or more horizontal planes passing through the imaging aperture 204. Of course, when the imaging assembly is a two-dimensional imaging assembly, the FOV also extends along one or more vertical planes through the imaging aperture 204. For example, the FOV of the imaging assembly may be designed to fill the imaging aperture 204.

The imaging device 200 may obtain job files from a user computing device which the imaging device 200 thereafter interprets and executes. The instructions included in the job file may include device configuration settings (also referenced herein as "imaging settings") operable to adjust the configuration of the imaging device 200 prior to capturing images of a target object.

For example, the device configuration settings may include instructions to adjust one or more settings related to the imaging aperture 204. As an example, assume that at least a portion of the intended analysis corresponding to a machine vision job requires the imaging device 200 to maximize the brightness of any captured image. To accommodate this requirement, the job file may include device configuration settings to perform operations describe herein to provide additional illumination to an object to capture images via the imaging aperture 204. The imaging device 104 may interpret these instructions and accordingly control one or more modes of operations of various components of illumination assemblies and imaging assemblies described herein (e.g., brightness of illumination sources, output illumination intensity, duration of time of illumination, exposure time of imaging sensor, frame rate of imaging assembly, etc.). Thus, the imaging device 200 may be configured to automatically adjust its own configuration to optimally conform to a particular machine vision or barcode scanning job. Additionally, the imaging device 200 may include or otherwise be adaptable to include, for example but without limitation, one or more bandpass filters, one or more polarizers, one or more DPM diffusers, one or more C-mount lenses, and/or one or more C-mount liquid lenses over or otherwise influencing the received illumination through the imaging aperture 204.

The user interface label 206 may include the dome switch/button 208 and one or more LEDs 210, and may thereby enable a variety of interactive and/or indicative features. Generally, the user interface label 206 may enable a user to trigger and/or tune to the imaging device 104 (e.g., via the dome switch/button 208) and to recognize when one or more functions, errors, and/or other actions have been performed or taken place with respect to the imaging device 104 (e.g., via the one or more LEDs 210). For example, the trigger function of a dome switch/button (e.g., dome/switch button 208) may enable a user to capture an image using the imaging device 104 and/or to display a trigger configuration screen of a user application. The trigger configuration screen may allow the user to configure one or more triggers for the imaging device 104 that may be stored in memory for use in later developed machine vision jobs.

As another example, the tuning function of a dome switch/button (e.g., dome/switch button 208) may enable a user to automatically and/or manually adjust the configuration of the imaging device 200 in accordance with a preferred/predetermined configuration and/or to display an imaging configuration screen of a user application. The imaging configuration screen may allow the user to configure one or more configurations of the imaging device 104 (e.g., aperture size, exposure length, etc.) that may be stored in memory for use in later developed machine vision jobs. Additionally, the imaging configuration screen may allow a user to control a moder of operation of the imaging device 200 for tuning the provided illumination of performing imaging in various environments and settings having different ambient light levels, and for scanning objects at various distances.

The mounting point(s) 212 may enable a user connecting and/or removably affixing the imaging device 200 to a mounting device (e.g., imaging tripod, camera mount, etc.), a structural surface (e.g., a warehouse wall, a warehouse ceiling, structural support beam, etc.), other accessory items, and/or any other suitable connecting devices, structures, or surfaces. For example, the imaging device 104 may be optimally placed on a mounting device in a distribution center, manufacturing plant, warehouse, and/or other facility to image and thereby monitor the quality/consistency of products, packages, and/or other items as they pass through the imaging device's 104 FOV. Moreover, the mounting point(s) 212 may enable a user to connect the imaging device 200 to a myriad of accessory items including, but without limitation, one or more external illumination devices, one or more mounting devices/brackets, and the like.

In addition, the imaging device 200 may include several hardware components contained within the housing 202 that enable connectivity to a computer network. For example, the imaging device 200 may include a networking interface that enables the imaging device 200 to connect to a network, such as a Gigabit Ethernet connection and/or a Dual Gigabit Ethernet connection. Further, the imaging device 200 may include transceivers and/or other communication components as part of the networking interface to communicate with other devices via, for example, Ethernet/IP, PROFINET, Modbus TCP, CC-Link, USB 3.0, RS-232, and/or any other suitable communication protocol or combinations thereof.

Figure 3:
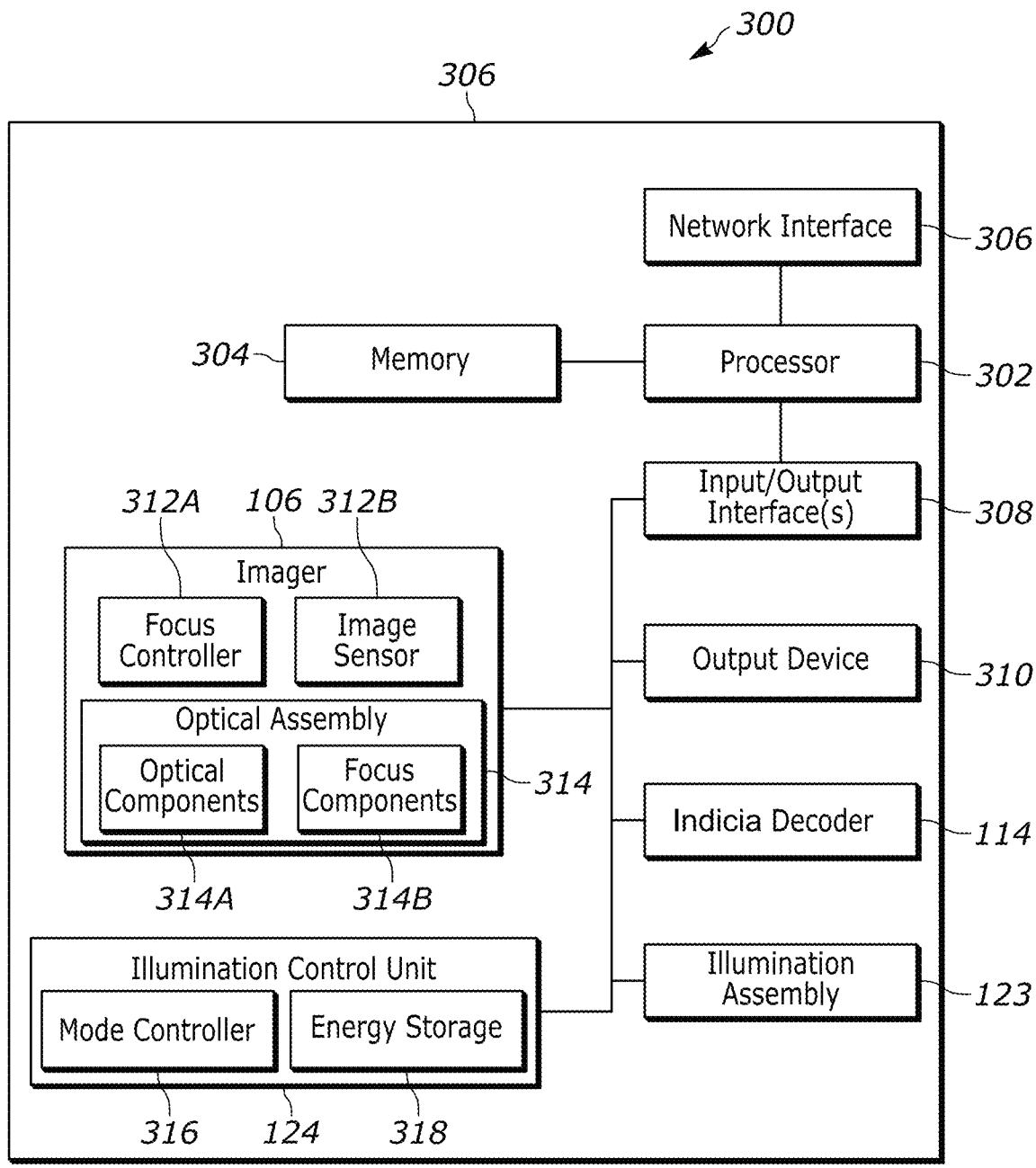
FIG. 3 is a block diagram representative of an example logic circuit capable of implementing, for example, the example imaging device of FIG. 1 or the device of FIG. 2, in accordance with embodiments described herein.

FIG. 3 is a block diagram representative of an example logic circuit capable of implementing, for example, the example imaging device 100 of FIG. 1 or the device 200 of FIG. 2. The example logic circuit of FIG. 3 is a processing platform 300 capable of executing instructions to, for example, implement operations of the example methods described herein, as may be represented by the flowcharts of the drawings that accompany this description. Other example logic circuits capable of, for example, implementing operations of the example methods described herein include field programmable gate arrays (FPGAs) and application specific integrated circuits (ASICs). The processing platform 300 may be included in the devices 100 and 200 of FIGS. 1 and 2 respectively, or in another devoice for performing the methods described herein.

The example processing platform 300 of FIG. 3 includes a processor 302 such as, for example, one or more microprocessors, controllers, and/or any suitable type of processor. The example processing platform 300 of FIG. 3 includes memory (e.g., volatile memory, non-volatile memory) 304 accessible by the processor 302 (e.g., via a memory controller). The example processor 302 interacts with the memory 304 to obtain, for example, machine-readable instructions stored in the memory 304 corresponding to, for example, the operations represented by the flowchart(s) of this disclosure. Additionally, or alternatively, machine-readable instructions corresponding to the example operations described herein may be stored on one or more removable media (e.g., a compact disc (CD), a digital versatile disc (DVD), removable flash memory, etc.) that may be coupled to the processing platform 300 to provide access to the machine-readable instructions stored thereon. The processor 302 and the memory 304 are disposed in the housing 301, which may be the housing 102 or 202 of FIG. 1, or FIG. 2.

The example processing platform 300 of FIG. 3 includes one or more communication interfaces such as, for example, one or more network interfaces 306, and/or one or more input/output (I/O) interfaces 308 disposed in the housing 301. The communication interface(s) may enable the processing platform 300 of FIG. 3 to communicate with, for example, another device, system, host system (e.g., an inventory management system, a POS station, etc.), datastore, database, and/or any other machine.

The example processing platform 300 of FIG. 3 may include the network interface(s) 306 to enable communication with other machines (e.g., an inventory management system, a POS station, etc.) via, for example, one or more networks. The example network interface(s) 306 include any suitable type of communication interface(s) (e.g., wired and/or wireless interfaces) configured to operate in accordance with any suitable communication protocol(s). Example network interfaces 306 include a TCP/IP interface, a Wi-Fi™ transceiver (e.g., according to the IEEE 802.11x family of standards), an Ethernet transceiver, a cellular network radio, a satellite network radio, or any other suitable interface based on any other suitable communication protocols or standards.

The example, processing platform 300 of FIG. 3 may include the input/output (I/O) interface(s) 308 (e.g., a Bluetooth® interface, a near-field communication (NFC) interface, a universal serial bus (USB) interface, a serial interface, an infrared interface, etc.) to (1) enable receipt of user input (e.g., from the trigger 120 of FIG. 1, a touch screen, keyboard, mouse, touch pad, joystick, trackball, microphone, button, etc.), (2) communicate output data (e.g., mode change confirmations, visual indicators, instructions, data, images, etc.) to the user (e.g., via an output device 210, speaker, printer, haptic device, etc.), and/or (3) interact with other components of the handheld scanner device 100 or device 200 of FIGS. 1 and 2 (e.g., the imaging assembly 106, the output device 210, the indicia decoder 114, the illumination assembly 123, the illumination control unit 124, etc.). Example output devices 310 may include a sound generation device, a haptic device, or the like.

To capture images of objects and/or barcodes on objects, the example processing platform 300 includes the imaging assembly 106 disposed in the housing. The imaging assembly 106 includes an image sensor 312B under control of, for example, the processor 302 to capture image frames representative of the portion of an environment in which the example imaging device 100 is operating that falls within the imaging FOV 108 of the imaging assembly 106. The image sensor 312B includes a plurality of photosensitive elements forming a substantially flat surface. The processor 302 may be communicatively coupled to the imaging assembly 106 via the input/output (1/O) interface(s) 308.

The imaging assembly 106 includes an optical assembly 314 to form images of objects in the FOV 108 on the surface of the image sensor 312B. The optical assembly 314 may include any number and/or type(s) of optical elements and/or components 314A including, for example, one or more lenses, filters, focus motors, apertures, lens holder, liquid lenses, or any other components and/or optical elements. Moreover, to focus the imaging assembly 106 on an object, the imaging assembly 106 may include a focus controller 312A, and the optical assembly 314 may include any number and/or type(s) of focus components 314B (e.g., motors, liquid lenses, etc.). In some examples, the focus controller 312A is implemented by the processor 302. In some examples, the imaging assembly 106 is a fixed-focus scanner.

The example processing platform 300 also includes any number and/or type(s) indicia decoders 114 (e.g., the indicia decoder 114 of FIG. 1) to detect and/or decode indicia to determine the payload of the indicia. In some examples, the indicia decoder 114 is implemented by the processor 302. The indicia decoder 114, e.g., via the processor 302, conveys the payload of decoded indicia to a host system via a communication interface such as the network interface(s) 306 and/or the I/O interface(s) 308. Further, to illuminate a target to be imaged, the example processing platform 300 may also include the illumination assembly 123. The illumination assembly 123 may emit illumination in the field of view 108 to, for example, facilitate autofocusing and/or improve the quality of image frames captured by an image sensor of the imaging assembly 106.

The example processing platform 300 may also include the illumination control unit 124 with components that are configured control operational modes of the imaging assembly 106 and the illumination assembly 123 to control the flow of power to various components, and control the mode operation of the components of the platform 300, as described herein. For example, the illumination control unit 124, may include an energy storage element 318 to store energy for providing energy to the illumination assembly, and a mode controller 316 to control various modes of operation of components of the processing platform 300 (e.g., the energy storage element 318, illumination assembly 123, imaging assembly 106, etc.). More specifically, the illumination control unit 124 may include an energy storage element 318, or be in electrical communication with an energy storage element 318, to provide energy via electrical current to the energy storage element 318. In further examples, the illumination control unit 124 may be in communication with one or more other components that may provide power to the energy storage element 218, and the illumination control unit may control the various elements to provide power to the energy storage element 318. For example, the illumination control unit 124 may not be in direct electrical communication with the energy storage element 318, but the illumination control unit 124 may be in communication with one or more electrical switches (e.g., transistors, MOSFETS, switch circuits, regulators, etc.), and may control the switches, to provide power to the energy storage element 318 to store energy in the energy storage element 318. In examples, the energy storage element may include one or more batteries, capacitors, or another electrical element capable of storing energy. Additionally, energy may be diverted from other resources such as processors, network interfaces, imaging sensors etc. to provide the energy.

The mode controller 316 may control various modes of operation of components of the platform. For example, the mode controller may control the imaging assembly 106 and the illumination assembly to operate in various modes, with each mode having varied parameters. For example, the controller may control the illumination assembly 123 to operate in a first mode, a second mode, and a third mode. In the first mode, the controller 316 may control the illumination assembly 123 to cause the illumination assembly to provide an illumination at a first illumination intensity and over a first period of time for illuminating an object and capturing images of the object by the imaging assembly 106. The first period of time may depend on the frame rate of image capture of the imaging assembly 106, and/or the type of image capture (e.g., rolling shutter, global shutter, etc.). The mode controller 316 may determine, based on an ambient light level, illumination of an environment, or illumination or determined brightness of a target object or image, that more illumination is required. For example, the illumination control unit 124 may be in communication with an ambient light sensor that provides a measurement of light in the environment to the illumination control unit. In implementations, an imaging sensor of the imaging assembly may be used as a light detector to determine the brightness or darkness of an image. If the image is dark, it is determined that more light is needed and more energy is required for the illumination. In some implementations, a proximity sensor is used as an infrared wake up system, this infrared sensor may have an integrated an ambient sensor which could be used to determine the brightness, or darkness, of an image or environment for performing the described methods. The illumination control unit 124 may then determine that more illumination is required to perform imaging and/or barcode reading, and the control unit 124 may control the illumination assembly 123 to operate in a second mode of operation. In the second mode of operation, the illumination assembly 123 may provide illumination at a second illumination intensity that is lower than the first illumination intensity, and in some implementations, in the second mode, the illumination assembly 123 may not provide any illumination at all. In the second mode, energy is diverted from the illumination assembly 123 to the energy storage element 318 to charge up the energy storage element 318 and store power in the energy storage element 318. As such, energy normally provided to the illumination assembly 123 is reduced in the second mode of operation, and the output illumination is reduced, or stopped altogether.

In examples, one or more targets or objects that provide its own illumination (e.g., a scree, cell phone, display, etc.) may be present in the FOV of the imaging assembly, and the imaging assembly may obtain one or more images of the illuminated screen during the second mode of operation. As such, the illumination assembly may provide no light, and the imaging assembly may capture the image of the screen, which may include images or indicia presented there on such as a barcode, and the device may further provide the image(s) of the screen to be decoded or for additional machine vision operations. In such examples, the imaging sensor may be configured to continue to capture images, and the device to decode the images, while energy is being stored in the energy storage element to further provide increased illumination while operating in a third mode of operation.

In specific examples, the energy storage element 318 may include a capacitor, and redirecting the energy to the energy storage element 318 may include redirecting electrical current to the capacitor to charge the capacitor. In implementations, the energy storage element may be configured to provide energy to the illumination assembly in one or more modes of operation of the illumination assembly. As such, the energy storage element may provide reduced energy to the illumination assembly to generate illumination at lower levels, or for shorter period of time, and the energy storage element 318 may provide greater energy to the illumination assembly to generate higher powers or light intensities and/or for longer periods of time. As such, in providing energy to the energy storage element 318, the energy may not need to be redirected to the energy storage element 318 in that energy may generally be provided to the energy storage element 318 in multiple modes of operation, and in the examples, more energy may be directed to the energy storage element to store more energy in the energy storage element 318. The capacitor may further be electrically coupled the illumination assembly to further provide the stored energy to the illumination assembly as required to controlled by the mode controller 316.

The mode controller 316 may control the illumination assembly to operate in the third mode of operation after a given amount of time, or after the energy storage element 318 has reached a certain amount of charge or power storage. In the third mode of operation, the mode controller 316 may control the illumination assembly 123 to provide illumination at a third illumination intensity. The third illumination intensity may be at a higher intensity than both he first illumination intensity and the second illumination intensity. To provide the third illumination, power from a power source may be provided back to the illumination assembly, and the energy stored in the energy storage element 318 may be provided to the illumination assembly at the same time to enable the illumination assembly to provide the higher third illumination intensity. In specific examples with a capacitor as the energy storage element 318, the illumination control unit may control electrical switches to provide an electrical connection between the energy storage element 318 and the illumination assembly 123, and the capacitor may discharge the stored energy to provide the energy to the illumination assembly 123, enabling the illumination assembly to provide the third illumination at a higher illumination intensity or similar illumination intensity with a same or similar current, but over a longer period of time. In any examples, more total energy is provided to the illumination assembly for capturing one frame of an image, as compared to other modes of operation. The greater energy provided to the illumination assembly allows for the generation of one super bright light intensity light pulse or less intensity pulse over a longer sensor exposure time. As such, the illumination assembly 123 is able to provide increased illumination due to the extra power provided by the energy stored in the energy storage element 318, during the third mode of operation.

In examples, the illumination control unit may further control the amount of time that the illumination assembly 123 provides illumination in the various modes of operation. For example, the mode controller may control the illumination assembly 123 to provide the first illumination for a first period of time while operating in the first mode of operation. The mode controller 316 may then control the illumination assembly to provide the second illumination for a second period of time in the second mode of operation. The second period of time may be shorter than the first period of time to allow for excess energy to be redirected from the illumination assembly 123 to the energy storage element 318. After energy has been stored in the energy storage element 318, the mode controller 316 may further control illumination assembly 123 to provide the third illumination for a third period of time. The third period of time may be shorter than the first and/or second period of time to provide a short high intensity pulse of illumination. In other examples, the third period of time may be a longer period of time than either of the first and/or second period time to provide sustained illumination for a longer period of time. In any examples, the total optical power output by the illumination assembly 123 is increased in the third mode of operation, and/or the illumination is provided for a longer period of time in the third mode of operation as compared to the first and second modes of operation.

The mode controller 316 may further control the imaging assembly 106 to operate various modes of operation. For example, the mode controller 316 may control the imaging assembly 106 to operate in a first mode with the imaging assembly 106 configured to capture images at a first frame rate, with a first exposure time, etc., with a first set of parameters for performing imaging of the FOV 108. The mode controller 316 may then control the imaging assembly 106 to operate in a second mode of operation with a second set of imaging parameters including one or more of a second frame rate, second exposure time, etc. In examples, the second frame rate may be a reduced frame rate as compared to the first frame rate causing the imaging assembly 106 to capture images at a slower rate than in the first mode of operation. As such, energy normally provided to the imaging assembly 106 to support the higher image frame capture rate, may be redirected from the imaging assembly 106 to the energy storage element 318 to store energy in the energy storage element 318. In specific examples, the second frame rate is half the frame rate of the first frame rate. Additionally, the mode controller 316 may cause the imaging assembly 106 not to capture any images while operating in the second mode, and the additional energy may be redirected to the energy storage element 318 while the imaging assembly, or components of the imaging assembly, are not active for obtaining images. The mode controller 316 may then control the imaging assembly 106 to operate in a third mode of operational with a third set of parameters such as a third frame rate, third exposure time, etc. The third frame rate may be a same rate as the first frame rate, or may be a decreased frame rate as compared to the first frame rate. Additionally, the third exposure time may be a same exposure time as the first exposure time, or a longer exposure time to capture more light for imaging an object or performing barcode reading.

In examples, the illumination assembly 123 may provide an aiming pattern, such as the aiming pattern 109 of FIG. 1. In some implementations, the device 100 may include an additional dedicated aiming assembly that is configured to provide the aiming pattern 109. In devices that provide an aiming pattern, the imaging assembly 106 may capture one or more images of the aiming pattern 109 and the device 100 (e.g., via the processor 302), may perform range detection of a target object based on the imaged aiming pattern 109. The mode controller 316 may then determine to operate the illumination assembly 123 and/or imaging assembly 106 in the first, second, or third operational modes based on the determined distance of the target object. For example, the illumination assembly 123 may provide adequate illumination to target objects that are closer to the device 100, and therefore, the mode controller 316 may determine that the imaging assembly 106 and illumination assembly 123 operate in the first mode of operation to image and/or perform barcode reading of nearby objects. For target objects that are farther from the device 100, the mode controller 316 may control the illumination assembly 123 and/or imaging assembly 106 to operate in the second mode to redirect energy to, and store energy in, the energy storage element 318, and then the mode controller 316 may control the illumination assembly 123 and/or imaging assembly to further operate in the third mode of operation to provide additional illumination to the target object and image the target object.

In additional implementations, the illumination control unit 124 may be in electrical communication with the energy storage element 318 and configured to be and to read or monitor a power level or a level of stored energy in the energy storage element 318. As such, the mode controller 316 may control the modes of operation of the illumination assembly 123, and/or imaging assembly 106 based on the level of energy stored in the energy storage element 318. For example, the mode controller 316 may control the illumination assembly 123 and/or imaging assembly 106 to operate in the second mode, to store energy in the energy storage element 318 until a certain amount of energy, power, or charge is stored in the energy storage element 318. The mode controller 316 may then control the illumination assembly 123 and/or the imaging assembly 106 to operate in the first or third modes to image a target object with additional illumination provided by the illumination assembly 123 and via discharging of the energy storage element.

In some implementations, the device 100 may include a dedicated brightness sensor configured to receive illumination and light from the environment, or more specifically, light from within the FOV of the imaging assembly (e.g., brightness of one or more objects in an imaging FOV brightness of a barcode or indicia, etc.) of the device and provide a signal indicative of the detected light to the illumination control unit 124. In such examples, the mode controller 316 may determine from the signal indicative of the ambient light or illumination of the environment, which operational mode to control the illumination assembly 123 and/or the imaging assembly 106 to operate in. The brightness sensor may include one or more of a photodiode, avalanche photodiode, a photoresistor, a phototransistor, or may include one or more imaging sensors or cameras of the imaging assembly or another sensor or device capable of detecting ambient light. In any implementations, the brightness sensor detects the brightness of the FOV of the imaging assembly In additional examples, the imaging control unit 124, or another processor such as the processor 302, may determine the illumination level via an image captured by the imaging assembly 106. For example, the imaging assembly 106 may capture an image of an object in the FOV 108. The object may be a target object for performing imaging processes or for performing barcode reading, or the object may be an illumination tuning target or object for performing ambient environmental detection. The illumination control unit 124, or the processor 302, may perform image processing and determine the illumination level from one or more objects in the captured image. For example, the illumination control unit 124 may determine the illumination level based on a brightness of the captured image. The mode controller 316 may then control the modes of operation of the illumination assembly 123 and/or the imaging assembly 106 based on the determined illumination level via the brightness of the image. For example, it may be determined that the brightness of the captured image is below a threshold, and that more illumination is required to capture an adequate image for performing additional image processing and/or barcode reading of an object. Therefore, the mode controller 316 may then control the modes of the illumination assembly 123 and/or the imaging assembly 106 to store energy in the energy storage element 318 and further provide higher illumination intensity to the FOV 108 for imaging the target object and/or performing barcode reading.

Figure 4:
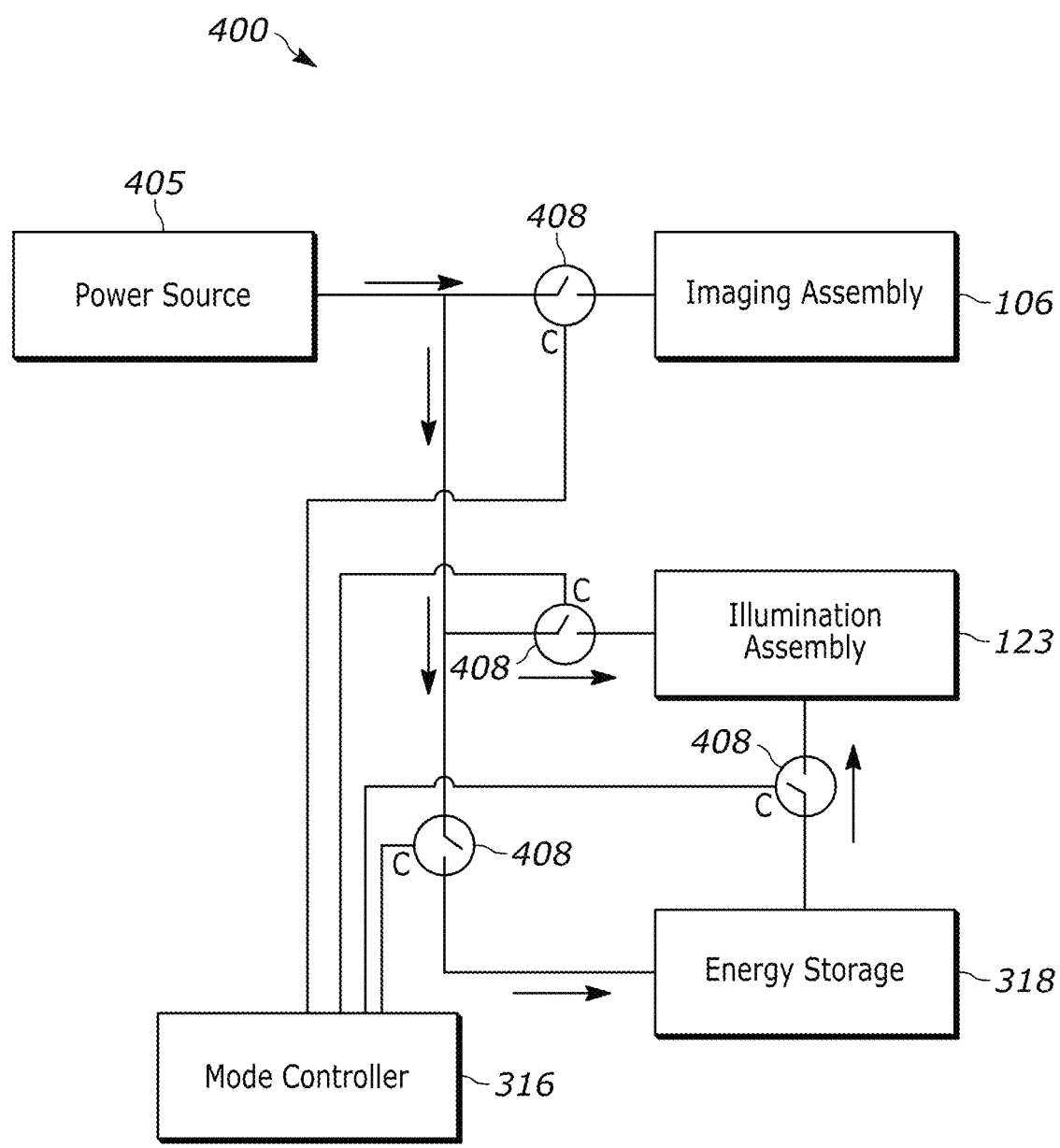
FIG. 4 illustrates an example power control circuit for adjusting illumination intensity for imaging and barcode reading operations, in accordance embodiments described herein.

FIG. 4 illustrates an example power control circuit 400 for adjusting brightness intensity for imaging and barcode reading operations, in accordance with the systems and methods of this disclosure. The circuit 400 includes a power source 405 electrically coupled to the imaging assembly 106, illumination assembly 123, and energy storage element 318 and configured to provide power to the imaging assembly 106, illumination assembly 123, and energy storage element 318. The power source 405 may be electrically coupled with additional elements (e.g., the processor 302, illumination control unit 124, etc.) to provide power to various elements of the device 100. FIG. 4 is presented with the power source 405 coupled to the imaging assembly 106, illumination assembly 123, and energy storage element 318 for simplicity and clarity in the described example.

Arrows along the electrical lines illustrate the flow of power from the power source 405 to the imaging assembly 106, illumination assembly 123, and the energy storage element 318. In the example of FIG. 4, voltage controlled switches 408 are electrically coupled to the electrical lines providing power to each of the imaging assembly 106, illumination assembly 123, and the energy storage element 318. Additionally, a voltage?? controlled switch 408 controls flow of electricity and power from the energy storage element 318 to the illumination assembly 123 to provide additional power from discharging of the energy storage element 318 to the illumination assembly 123, and described herein. The mode controller 316 may be in electrical communication with each of the voltage controlled switches at a control port "c" of each of the voltage controlled switches 408 to control the flow of power from the power source 405 to each of the imaging assembly 106, illumination assembly 123, and the energy storage element 318. As such, the mode controller 316 controls the flow of power to the various elements illustrated in FIG. 4, and further, is configured to redirect power and energy from the imaging assembly 106 and illumination assembly 123 to the energy storage element 318 to store energy in the energy storage element. The mode controller 316 controls each of the voltage controlled switches 408 independently to control the flow of power in the circuit 400 and to control operations of the imaging assembly 106, illumination assembly 123, and the energy storage element 318. In addition to controlling the flow of power, the mode controller 316 may further by in communication with the imaging assembly 106 and illumination assembly 123 to control various parameters of the imaging assembly 106 (e.g., frame capture rate, exposure time, etc.) and the illumination assembly 123 (e.g., illumination intensity output, illumination duration, etc.) to perform the methods described herein.

It should be understood that the circuit 400 of FIG. 4 is one example of a power control circuit for performing the methods described herein and is provided for clarity. It should be appreciated that the example circuit 400 may include other electronic component(s) that are electrically coupled to the example circuit 400. For example, the circuit 400 may include additional voltage or power sources, additional current paths, additional regulators or switches, a wireless power transfer transmitter, and/or any other suitable electronic components or combinations thereof. Additionally, the example circuit 400 may also be electrically coupled to a ground (not shown), such that the example circuit 400 receives input drive voltage from the power source 405 which may discharge to the ground regardless of whether the current flows to each component of the example circuit 400.

Figure 5:
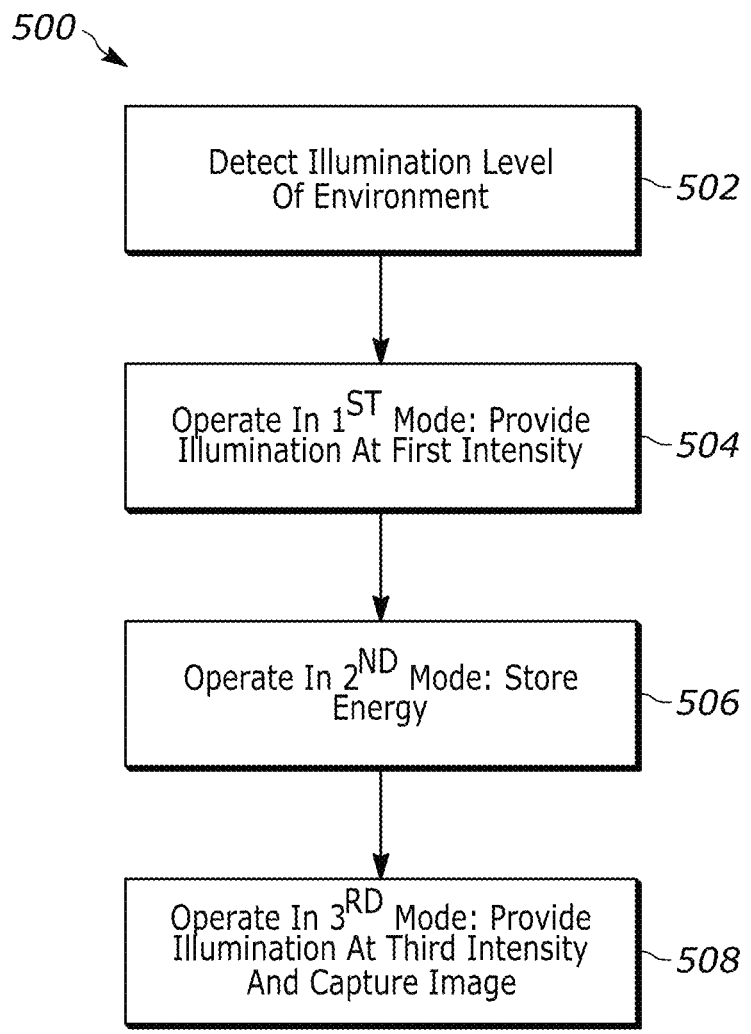
FIG. 5 illustrates an example method for adjusting illumination intensity of an illumination assembly based on detected illumination of an environment or target object, in accordance with various embodiments and examples provided herein.

FIG. 5 illustrates an example method 500 for adjusting illumination intensity of an illumination assembly based on detected illumination or light of an environment, in accordance with various embodiments and examples provided herein. It should be understood that, in certain embodiments, any of the blocks of the method 500 may be performed by any of the example imaging devices 100 or 200 or elements of the devices such as the processor(s) 302, illumination control unit 124, imaging assembly 106, illumination assembly 123, etc., and/or any other suitable device or combinations thereof. For clarity and simplicity, the method 500 of FIG. 5 will be described with reference to elements of FIGS. 1 and 3.

The method 500 includes detecting an illumination level or brightness of an ambient environment or of a captured image of a target object, at block 502. The device 100 may detect the illumination level via a dedicated brightness detector, by image processing of an image captured by the image assembly 106, via one or more cameras or sensors of the imaging assembly 106, or by another means. At block 504, a controller, such as the mode controller 316, controls the illumination assembly to operate in a first mode. In the first mode, the illumination assembly 123 provides an illumination at a first intensity to the FOV 108 of the imaging assembly 106. The illumination assembly provides the illumination for a first period of time while operating in the first mode. The controller may further control the imaging assembly 106 to operate in a first mode, with the imaging assembly 106 capturing images at a first frame rate, or for a first exposure time.

The mode controller 316 may then control the illumination assembly 123 and/or the imaging assembly 106 to operate in a second mode of operation to store energy in the energy storage element 318, at block 504. The controller 316 may determine that the illumination intensity is too low via an ambient light sensor, dedicated brightness sensor or performing image process of an image captured by the imaging assembly, and the controller 316 may control operations and parameters of the illumination assembly 123 and/or the imaging assembly 106 to redirect power from the illumination assembly 123 and/or the imaging assembly 106 to the energy storage element 318.

The mode controller 316 may then control the illumination assembly 123 and/or the imaging assembly 106 to operate in a third mode of operation to provide the energy from the energy storage element 318 to the illumination assembly 123 to increase the illumination intensity and/or period of time of illumination provided by the illumination assembly 123. The illumination assembly 123 provides illumination at the more intense, third illumination intensity, and the imaging assembly 106 captures an image of a target object in the FOV 108 of the imaging assembly at block 508.

The mode controller 316 may control the modes, and accordingly various operational parameters of, and power flow to, the illumination assembly 123, imaging assembly 106, and the energy storage element 318 based on a detected level of ambient light, a determined illumination level of a target object, a brightness level of an image, an energy or power level of the energy storage element 318, an amount of time, a determined distance of a target object, etc. As such, the described example systems and methods provide the ability for a system to adjust illumination output of an illumination assembly to provide adequate illumination for performing imaging and barcode reading operations. The described systems and methods may be implemented in systems and devices with limited power or current capabilities (e.g., handheld devices, portable devices, devices with limited power supplies or limited currents, USB powered devices, etc.) for enabling imaging and barcode reading in broader ranges of applications and environments.

The above description may refer to a block diagram of the accompanying drawings. Alternative implementations of the example represented by the block diagram includes one or more additional or alternative elements, processes and/or devices. Additionally or alternatively, one or more of the example blocks of the diagram may be combined, divided, re-arranged or omitted. Components represented by the blocks of the diagram are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions.

As used herein, each of the terms "tangible machine-readable medium," "non-transitory machine-readable medium," "computer-readable media," "computer-readable storage medium," and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The invention claimed is:

1. A method for adjusting illumination intensity of a data capture device having an illumination assembly and an imaging assembly, the method comprising:
   detecting an illumination level of an environment of the imaging based data capture device;
   operating at least one of the illumination assembly and the imaging assembly in a first mode over a first period of time, a second mode over a second period of time, and a third mode over a third period of time;
   providing, by the illumination assembly operated in the first mode, a first illumination having a first intensity;
   storing energy, with the illumination assembly operated in the second mode, in an energy storage element;
   providing, by the illumination assembly operated in the third mode, third illumination at third intensity higher than the first intensity; and
   controlling, by a controller, the illumination assembly to be configured to be in the first mode, second mode, or third mode based on the illumination level.

2. The method of claim 1, further comprising:
   capturing, by the imaging assembly operating in the first mode, images at a first frame rate; and
   capturing, by the imaging assembly operating in the second mode, images at a second frame rate, the second frame rate being a reduced frame rate as compared to the first frame rate.

3. The method of claim 2, wherein the second frame rate has a value half that of the first frame rate.

4. The method of claim 1, wherein storing energy comprises redirecting energy from at least one of the imaging assembly and the illumination assembly to a capacitor electrically coupled with an illumination source of the illumination assembly.

5. The method of claim 4, where providing the third illumination comprises discharging the capacitor to provide the stored energy to the illumination source of the illumination assembly in the third mode of the illumination assembly.

6. The method of claim 1, wherein the third period time is a longer period of time that the first period of time.

7. The method of claim 1, further comprising providing, with illumination assembly operated in the second mode, no illumination from the illumination assembly, and wherein storing energy comprises redirecting energy from the illumination assembly to the energy storage element.

8. The method of claim 1, further comprising:
   providing, via an aiming assembly, an aiming pattern to a field of view of the imaging assembly;
   performing range detection using the aiming pattern and determining a distance of a target object;
   and controlling, via the controller and based on the distance of the target object, the mode of the illumination assembly.

9. The method of claim 1, further comprising further controlling, via the controller and based on an energy level of the energy storage element, the mode of at least one of the imaging assembly and the illumination assembly.

10. The method of claim 1, wherein detecting the illumination level comprises detection the illumination level by a dedicated brightness sensor configured to receive illumination from a field of view of the imaging assembly and provide a signal indicative of the illumination to the controller.

11. The method of claim 1, wherein detecting the illumination level comprises:
   capturing, via the imaging assembly, an image of a field of view of the imaging assembly; and
   determining the illumination level from the captured image of the field of view.

12. A data capture device comprising:
   an imaging assembly having an imaging sensor configured to capture images of a field of view of the imaging assembly;
   an illumination assembly having one or more illumination sources configured to provide illumination to at least a portion of the field of view of the imaging assembly;
   and a controller configured to control modes of operation of the illumination assembly in a first mode, a second mode, or a third mode; and
   one or more processors and machine readable instructions that when executed by the one or more processors cause the device to:
   detect an illumination level of an environment of the device;
   provide, by the illumination assembly in the first mode, first illumination having a first intensity over a first period of time;
   store energy, with the illumination assembly in the second mode, in an energy storage element;
   provide, by the illumination assembly in the third mode, third illumination at a third intensity higher than the first intensity for a third period of time; and control the illumination assembly to be configured to be in the first mode, second mode, or third mode based on the illumination level.

13. The device of claim 12, further the machine readable instructions further cause the device to:
   capture, by the imaging assembly in a first mode, images at a first frame rate; and
   capture, by the imaging assembly in a second mode, images at a second frame rate, the second frame rate being a reduced frame rate as compared to the first frame rate.

14. The device of claim 12, wherein to store energy the machine readable instructions cause the device to redirect energy from at least one of the imaging assembly and the illumination assembly to a capacitor electrically coupled with the illumination source of the illumination assembly.

15. The device of claim 12, wherein the third period of time is a longer period of time that the first period of time.

16. The device of claim 12, wherein the machine readable instructions further cause the device to provide no illumination from the illumination assembly in the second mode and store energy by redirecting energy from the illumination assembly to the energy storage element.

17. The device of claim 12, further comprising an aiming assembly configured to provide a visual indicator of the field of view of the imaging assembly, and wherein the machine readable instructions further cause the device to:
   provide, via the aiming assembly, the visual indicator of the field of view of the imaging assembly;
   performing range detection using the visual indicator and determine a distance of a target object;
   and control, via the controller and based on the distance of the target object, the mode of at least one or more of the imaging assembly and the illumination assembly.

18. The device of claim 12, wherein the machine readable instructions further cause the device to further control, based on an energy level of the energy storage element, the mode of at least one of the imaging assembly and the illumination assembly.

19. The device of claim 12, further comprising a brightness sensor configured to detect the illumination level of the environment and to provide a signal indicative of the illumination level to the controller for controlling the mode of one or more of the imaging assembly and the illumination assembly.

20. One or more non-transitory computer-readable media storing computer-executable instructions that, when executed via one or more processors, cause one or more systems to:
   detect an illumination level of an environment of the device;
   provide, by an illumination assembly in a first mode, first illumination having a first intensity over a first period of time;
   store energy, with the illumination assembly in a second mode, in an energy storage element in the second mode;
   provide, by the illumination assembly in a third mode, third illumination at third intensity higher than the first intensity for a third period of time; and
   control, by a controller, the illumination assembly to be configured to be in the first mode, second mode, or third mode based on the illumination level.

* * * * *